3,127,384
PROCESS OF IMPROVING A HALOGEN-CONTAINING POLYMER
Anthony Archibald Sparks, Epsom Downs, and Kenneth Henry Charles Bessant, Banstead, England, assignors to The Distillers Company Limited, Edinburgh, Scotland, a British company
No Drawing. Filed Nov. 28, 1960, Ser. No. 71,881
Claims priority, application Great Britain Dec. 16, 1959
11 Claims. (Cl. 260—92.8)

The present invention relates to an improved process for the production of articles from thermoplastic polymers containing halogen atoms, and particularly from vinyl chloride polymers, by moulding or extrusion at elevated temperatures.

In the manufacture of products by moulding or extruding thermoplastic polymers the polymer is formed into the finished product by being subjected to sufficient pressure at an elevated temperature to cause it to take up the desired shape. When polymers containing halogen atoms are employed it is often found that they are discoloured at the elevated temperature of the moulding or extrusion step and consequently the produced articles are discoloured. An object of the present invention is to provide an improved process for the production of moulded or extruded products.

According to the present invention the process for the manufacture of moulded or extruded products comprises contacting a halogen-containing polymer in a divided form with a nitrogen compound selected from the group consisting of nitric oxide, nitrogen peroxide and nitrosyl halides and subsequently moulding or extruding the halogen-containing polymer while it retains adsorbed nitrogen compound.

Any halogen-containing polymer can be employed in the process of the present invention including polymeric products obtained by the halogenation of polymers. Particularly good results are obtained using vinyl chloride polymers. By "vinyl chloride polymer" is meant throughout this specification polyvinyl chloride or a copolymer of vinyl chloride containing at least 50% by weight of polymerized vinyl chloride units in its molecular structure. The present invention is particularly applicable to the manufacture of products from all types of polyvinyl chloride, for example polyvinyl chloride prepared in aqueous emulsion or dispersion systems or in systems where the monomer itself or an organic diluent is employed as a dispersing phase.

The halogen-containing polymer can be brought into contact under any convenient conditions with the nitrogen compound. Preferably the gaseous nitrogen compound is passed through divided, dry, solid polymer or the solid polymer is agitated in an atmosphere of the nitrogen compound. Alternatively an aqueous slurry of polymer, e.g. the latex produced as a result of an emulsion polymerization or the suspension produced by a suspension polymerization, can be shaken with the nitrogen compound when the latter is nitric oxide or nitrogen peroxide. It is found that the nitrogen oxide or nitrogen peroxide remains adsorbed on the surface of the polymer during the normal steps involved in the recovery of the polymer from the slurry in a form ready for subsequent moulding or extrusion.

The halogen containing polymer is in a divided form during its contact with the nitrogen compound and it is found that the more finely divided the polymer, the shorter the contact time necessary in order to obtain good adsorption of the nitrogen compound by the polymer.

The nitrogen compounds can be used singly or as mixtures or they may be diluted with an inert gas such as nitrogen. The preferred material is nitric oxide. They may also be produced in situ and accordingly one method of operating the process of the present invention comprises mixing the halogen-containing polymer with an inorganic or organic compound which yields the required nitrogen compound under suitable conditions and treating said mixture under said conditions.

The halogen-containing polymer is contacted with the nitrogen compound at any convenient temperature, for example room temperature 0° C. to 30° C. or at an elevated temperature, for example 100° C.

The polymer after contact with the nitrogen compound is moulded or extruded by conventional techniques while it still retains adsorbed nitrogen compound. It is important that the polymer after contact with the nitrogen compound should no be treated in any way which would cause it to lose all adsorbed nitrogen compound. Preferably the polymers are moulded or extruded directly the contacting step with the nitrogen compound is completed.

Moulded or extruded products manufactured according to the process of the present invention show surprisingly improved colour and other mechanical properties when compared with products manufactured by similar processes from the halogen-containing polymers which have not been contacted with the nitrogen compounds.

The following examples illustrate the process of the present invention as applied to the improvement of polyvinyl chloride and copolymers of vinyl chloride.

*Example 1*

A sample of dry, finely divided polyvinyl chloride sold under the trade name Geon 101 ("Geon" is a registered trademark) was placed in a glass vessel through which nitrogen was passed to remove any oxygen. The vessel was evacuated and nitric oxide was passed in. The vessel was sealed and allowed to stand at room temperature (18° C.) for 48 hours with occasional shaking. The polyvinyl chloride was pressed at 150° C. directly after being removed from the vessel to give a sheet of less colour than a similar sheet made from the untreated Geon 101.

*Example 2*

Example 1 was repeated using the polymer in the form of a slurry direct from the polymerizer vessel. The slurry was agitated by end-over-end rotation at room temperature for 16 hours. The polymer was then filtered and dried without washing and pressed or extruded at 170° C. The sheet or extrudate was substantially less coloured than when untreated polymer was used.

*Example 3*

A vertical glass tube fitted with a sintered glass base was charged with a series of polymers and in each case the bed of polymer was fluidized with a stream of nitric oxide for 10–15 minutes at room temperature (18° C.). The treated polymer was allowed to stand for a further 15 minutes and the large excess of nitric oxide was removed by a stream of nitrogen which however did not remove all adsorbed nitric oxide. The polymer was then pressed and extruded in the usual way at an elevated temperature. Three samples of polyvinyl chloride sold under the trade names, Geon 101, Geon 111, Geon 115 and a sample of a vinylchloride vinylacetate copolymer sold under the trade name Geon 425 all gave less coloured products after the above nitric oxide treatment.

We claim:
1. A process for the manufacture of products which comprise contacting (a) a halogen-containing polymer in a divided form, said halogen-containing polymer being a member selected from the group consisting of polyvinyl chloride and copolymers of vinyl chloride containing at least 50% by weight of polymerized vinyl chloride units in its molecular structure, with (b) a nitrogen compound selected from the group consisting of nitric oxide, nitrogen peroxide and nitrosyl halides and subsequently forming the halogen containing polymer into the finished product by the action of heat and pressure while it retains adsorbed nitrogen compound.

2. A process as claimed in claim 1, wherein the halogen-containing polymer is in a dry state when contacted with the nitrogen compound.

3. A process as claimed in claim 1, wherein the nitrogen compound is nitric oxide.

4. A process for protecting vinyl chloride polymer against discoloration at elevated temperatures which comprises (1) contacting the vinyl chloride polymer in a finely divided form with a nitrogen compound selected from the group consisting of nitric oxide, nitrogen peroxide and nitrosyl halide and (2) subsequently forming the vinyl chloride polymer into a finished product by the action of heat and pressure while it retains adsorbed the nitrogen compound.

5. A process for protecting polyvinyl chloride against discoloration at elevated temperatures which comprises (1) contacting the polyvinyl chloride in a finely divided form with a nitrogen compound selected from the group consisting of nitric oxide, nitrogen peroxide and nitrosyl halide and (2) subsequently forming the polyvinyl chloride into a finished product by the action of heat and pressure while it retains adsorbed the nitrogen compound.

6. A process for protecting copolymer or vinyl chloride, containing at least 50% by weight of polymerized vinyl chloride units in its molecular structure against discoloration at elevated temperatures which comprises (1) contacting the copolymer of vinyl chloride in a finely divided form with a nitrogen compound selected from the group consisting of nitric oxide, nitrogen peroxide and nitrosyl halide and (2) subsequently forming the copolymer of vinyl chloride, into a finished product by the action of heat and pressure while it retains adsorbed the nitrogen compound.

7. A process for protecting vinylchloride-vinylacetate copolymer against discoloration at elevated temperatures which comprises (1) contacting the vinylchloride-vinylacetate copolymer in a finely divided form with a nitrogen compound selected from the group consisting of nitric oxide, nitrogen peroxide and nitrosyl halide and (2) subsequently forming the vinylchloride-vinylacetate copolymer into a finished product by the action of heat and pressure while it retains adsorbed the nitrogen compound.

8. A process for protecting vinyl chloride polymer against discoloration at elevated temperatures which consists essentially of (1) contacting particles of dry solid vinyl chloride polymer in a finely divided form with gaseous nitric oxide, whereby the nitric oxide is adsorbed on the surface of the particles, and (2) subsequently forming the vinyl chloride polymer into a finished product by the action of heat and pressure while it retains adsorbed said nitric oxide.

9. Finely divided particles of dry solid vinyl chloride polymer having gaseous nitric oxide adsorbed thereon.

10. A process for protecting vinyl chloride polymer against discoloration at elevated temperatures which consists essentially of (1) contacting particles of dry solid vinyl chloride polymer in a finely divided form with gaseous nitrogen peroxide, whereby the nitrogen peroxide is adsorbed on the surface of the particles, and (2) subsequently forming the vinyl chloride polymer into a finished product by the action of heat and pressure while it retains adsorbed said nitrogen peroxide.

11. Finely divided particles of dry solid vinyl chloride polymer having gaseous nitrogen peroxide adsorbed thereon, the vinyl chloride polymer being a member selected from the group consisting of polyvinyl chloride and copolymer of vinyl chloride containing at least 50% by weight of polymerized vinyl chloride units in its molecular structure.

References Cited in the file of this patent

UNITED STATES PATENTS 2,831,840 Lindeboom _____ Apr. 22, 1958
3,052,663 Bodlaender et al. _____ Sept. 4, 1962

OTHER REFERENCES

Ostromislensky: Chemiker-zeitung, January 11, 1913, page 19.

Remy: Treatise On Inorganic Chemistry, volume 1, pages 593 and 595, Elsevier (1956)